(No Model.) 2 Sheets—Sheet 1.
G. & L. KESLING.
ADJUSTABLE AND REVERSIBLE FENCE MACHINE.
No. 358,121. Patented Feb. 22, 1887.
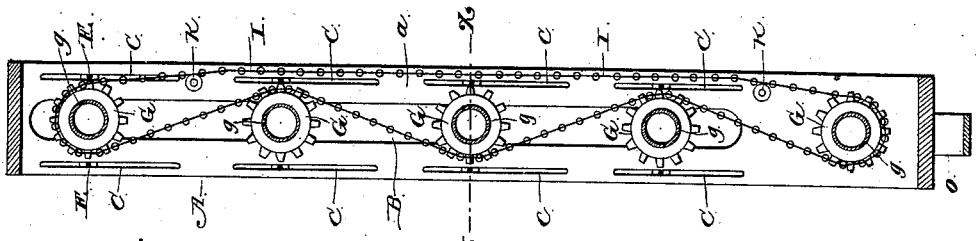
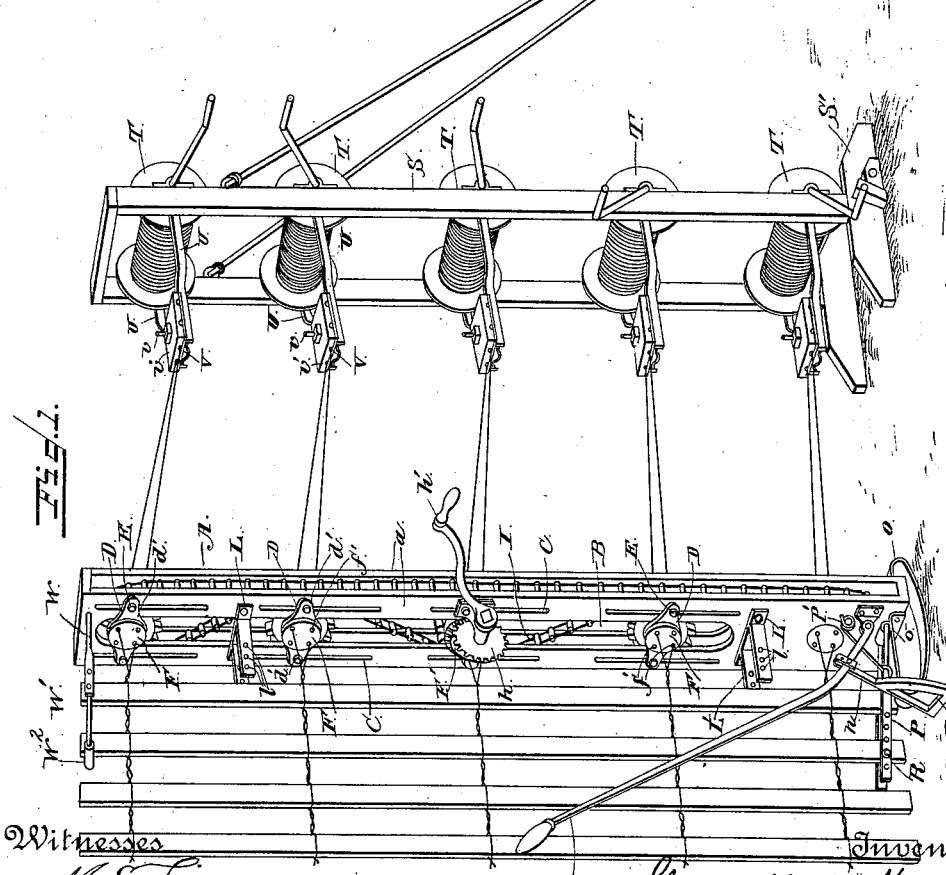

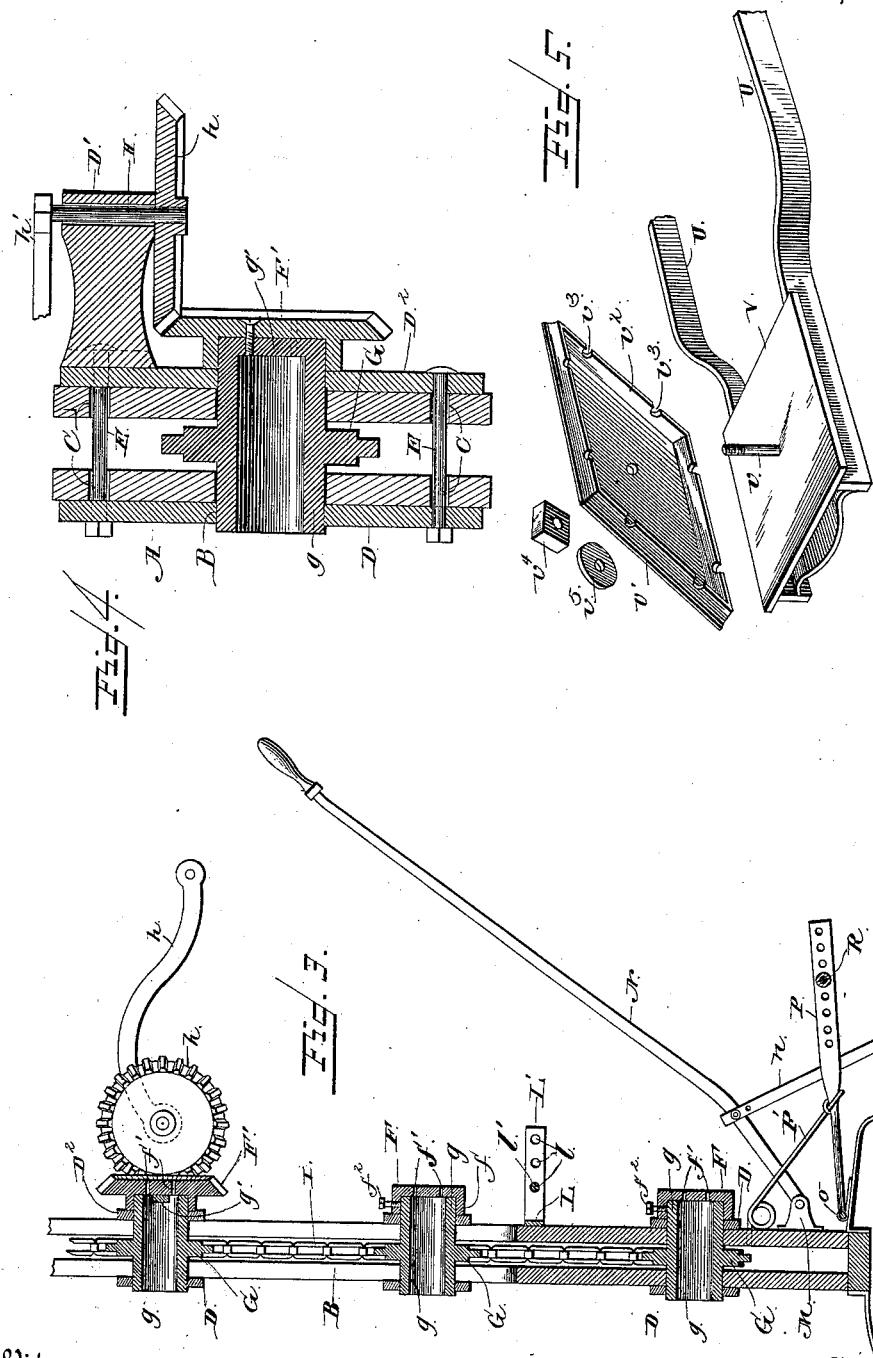

UNITED STATES PATENT OFFICE.

GRANVILLE KESLING AND LUTHER KESLING, OF ONWARD, INDIANA.

ADJUSTABLE AND REVERSIBLE FENCE-MACHINE.

SPECIFICATION forming part of Letters Patent No. 358,121, dated February 22, 1887.

Application filed November 26, 1886. Serial No. 219,970. (No model.)

*To all whom it may concern:*

Be it known that we, GRANVILLE KESLING and LUTHER KESLING, citizens of the United States, residing at Onward, in the county of Cass and State of Indiana, have invented a new and useful Improvement in Adjustable and Reversible Fence-Machines, of which the following is a specification.

Our invention relates to an improvement in machines for making slat and wire fences; and it consists in the peculiar construction and combination of parts, that will be more fully set forth hereinafter, and particularly pointed out in the claims.

This invention is an improvement on the machine described in Letters Patent of the United States No. 346,923, granted to us August 10, 1886.

In the drawings, Figure 1 is a perspective view of a fence-making machine embodying our improvements. Figs. 2 and 3 are vertical sectional views of the same. Fig. 4 is a horizontal transverse section taken on the line $xx$ of Fig. 2. Fig. 5 is a detailed perspective view of one of the tension devices with the upper plate removed.

A represents a vertical frame, which is provided with the closed sides $a$, and the said frame or box is of any suitable length. In the sides $a$ are made vertical elongated slots B, and on each side of the said slots are similar slots, C, which are of much less width than the slots B.

D represents bearing-plates having the enlarged central portions provided with the circular openings $d$ and the extended arms $d'$. Clamping-bolts E pass through the openings which are made in the outer ends of these arms, and extend through the slots C, so as to secure the plates on the front side of the frame or box in a horizontal position, with the central openings of the said plates registering with the slots B. By loosening the clamping-nuts on the threaded ends of the bolts E the plates D may be adjusted vertically on the box or frame A.

F represents circular disks having annular flanges $f$, which extend from their rear sides. These disks are provided with openings $f'$, arranged at a suitable distance apart.

G represents sprocket-wheels, which are provided with central projecting hubs, $g$, on each side, which enter the annular flanges $f$ of the disks and extend through the openings $d$ of the plates D, and are thereby journaled in the frame A. Set-screws $f^2$, which extend through the flanges $f$, bear on the hubs, and thus cause the wheels G and the disks F to rotate together. By providing the sprocket-wheels with extended hubs, on one end of which are secured the disks F, and which are journaled in the plates D, the disks are caused to rotate with the sprockets when the latter are turned, and both the disks and sprocket-wheels are adjusted vertically by the vertical adjustment of the plates D. Thus both the sprocket-wheels and the twisters or hubs will be carried by the plates D in the adjustment of the latter. The connection of the disks to the hubs of the sprocket-wheels by means of set-screws enables the disks to be detachably fitted in place, so as to permit their removal at will. If the disks were not removable, the plates D could not be inserted over the hubs of the sprocket-wheels. Through each of the wheels G is made a central opening, as shown.

One of the hubs $g$ at the center of the frame is provided at its front end with a cross-bar, $g'$, to which is secured a miter gear-wheel, F, by a screw which enters the cross-bar. This gear-wheel has an annular flange that fits on the extended end of the hub, so that one screw is sufficient to secure the wheel thereto, and the disk of the wheel is provided with openings $f'$, for the passage of the wires.

$D^2$ represents a plate in which the front end of the said hub is journaled, the said plate being similar to the plates D and having a projecting bearing, $D'$, in which is journaled a shaft, H. This shaft has secured to its inner end a miter gear-wheel, $h$, which meshes with the disk F', and at the outer end of the said shaft is attached a crank-handle, $h'$. By this construction it will be readily understood that the plate may be removed from the frame and applied and secured thereto in the reverse position from that shown in Fig. 1, so as to cause the crank-handle to project from either side of the frame A, and thus adapt the machine to be operated from either side of the fence. An endless sprocket-chain, I, passes over the series of sprocket-wheels G, and connects them together in such a manner as to cause alternate sprocket-wheels to rotate in opposite directions when the crank is turned, as shown in Fig. 2. Anti-friction rollers K bear against the outer side of the endless sprocket-chain, and are journaled in between the sides of the box or frame A. On the front side of the box or frame A are secured brackets L, having forwardly-extending horizontal parallel arms L', provided with the series of aligned openings $l$, through which pass transverse horizontal pins $l'$. By means of this series of openings the pins may be adjusted in or out of the arms L'. This regulates the space between the pickets. The pins press the pickets back solid in the wire before twisting.

On the front side of the box or frame A, near the lower end thereof and near its opposite sides, are projecting ears M, to either of which may be pivoted the lower end of a hand-lever, N, which lever has a pivoted arm, $n$, the lower end of which is adapted to bear upon the ground, and has a stirrup, $n'$. The function of this hand-lever and depending arm is to urge the machine forward as each picket is secured between the wires, and this is done by the operator placing his foot in the stirrup, to prevent the arm from slipping, and then bearing down upon the outer end of the lever N.

To the lower end of the box or frame A is secured a supporting shoe or runner, O. On the front end of this runner, on the upper side thereof, is a clip, $o$, to which is pivoted a yoke, P, having parallel arms provided with a series of openings in which is secured a transverse pin, R, which may be adjusted longitudinally in the loop. This loop is adapted to engage the lower end of one of the pickets, and has a spring, P', to normally raise it into engagement with the picket.

From the rear side of the box or frame A, at the upper end thereof, projects a horizontal arm, W, having a longitudinal series of openings. To the said arm, and longitudinally adjustable thereon, is attached a loop, W', having a transverse stop, W², adapted to engage the upper end of one of the pickets which has already been secured in place. By raising the loop W' it is disengaged from the picket.

S represents a vertical rectangular frame having a supporting-base, S', to rest on the ground. This frame is secured firmly to stakes driven in the ground, and forms a rack for a series of spools, T, which are journaled therein. The said spools correspond in number to the sprocket-wheels in the frame A, and are each provided with a crank whereby they may be rotated. On these spools are coiled the wires to be used in the construction of the fence.

U represents horizontal arms, which project rearwardly from the spool-rack on the same planes with the spools, and each horizontal pair of the said arms carries at its rear end a base-plate, V, having a vertical bolt, $v$, projecting from its center.

On the upper side of the base-plate is secured a plate, $v'$, having depending flanges $v^2$ at its sides and ends adapted to rest on the base-plate, and having notches or openings $v^3$ on their lower sides for the reception of the wires. The bolt $v$ passes through a central opening in the top plate, and on the outer end of the said bolt is secured a nut, $v^4$, thereby firmly clamping the plates together. The depth of the notches is not equal to the diameter of the wires, and thereby the plates bear against opposite sides of the wires, and by tightening or loosening the nut the tension of the plates on the wires may be regulated at will. A rubber or other elastic washer, $v^5$, is inserted between the top plate and the clamping-nut.

The operation of our invention is as follows: The wires from the spools are passed between the tension-plates, and from thence are passed in pairs through the openings in the sprocket-wheels G and through opposite openings, $f$, in the disks F. The outer ends of the said wires are attached securely to the corner fence-post. A slat, $c$, is passed between the arms of the brackets L and between the pairs of wires, and the crank $h'$ is then turned once or twice, which causes the disks to rotate, and thus twist the wires and secure the slats thereto. The box or frame A is then moved forwardly from the slat for a slight distance, the loop W' is caused to engage with the upper end of the slat, and the pin R, secured between the spring-arms P, bears against the lower end of the preceding slat on one edge thereof, and thus maintains the box or frame A in a vertical position parallel with the slats and at a suitable distance therefrom. This distance may be regulated or adjusted by attaching the loop W' in either of the series of openings $l$ in the bracket, and by moving the pin R in or out in the outer end of the loop P, by means of the series of openings therein, this loop W' is adapted to swing upward out of engagement with the slats or pickets of the fence when adjusting the slats. A third slat is then inserted between the wires and the parallel arms of the bracket and bears against the pins $l'$ secured therein. The stirrup-arm $n$ of the hand-lever N bears against the ground and the machine is urged forward a suitable distance, as before described. The crank is then turned, as in the previous instance, causing the disks F to rotate and twist the wires, so as to secure the second slat thereto. The loop W' and the loop P are then disengaged from the upper and lower ends of the slats, and the hand-lever N is depressed, which lever causes the shoe or runner to move on the ground for a suitable distance and carry the box or frame A to a suitable position for inserting another slat, and so on until the fence is completed. The wires are secured to ordinary fence-posts driven in the ground at suitable distances apart, from time to time, in order to secure the fence.

A machine thus constructed is cheap and simple, is very durable, and enables the fence to be built with great rapidity, and can be operated from either side of the fence with equal ease.

Having thus described our invention, we claim—

1. The spool-rack having the projecting arms on the same plane with the spools, carrying the tension devices at their outer ends, substantially as described.

2. The combination of the spool-rack having the tension devices secured thereto at their outer ends, and the spools or reels journaled in the spool-rack, substantially as described.

3. The combination of the spool-rack, the spools journaled therein, the arms U, projecting from one side of the spool-rack, the base-plate connecting the outer ends of the said arms, and the plate $v'$, clamped to the base-plate and having the depending flanges provided with notches for the wires on the spools, substantially as described.

4. In a machine for making fences, the combination of the hub through which the wires pass, having the cross-bar $g'$ at one end, and the gear-wheel removably secured to the said cross-bar and having the openings for the wires, substantially as described.

5. In a machine for making fences, the combination of the hub through which the wires pass, and having the cross-bar, and the gear-wheel having the flange to fit the end of the hub, and the screw to secure it to the cross-bar, substantially as described.

6. In a fence-making machine, the movable box or frame A, having the twisting devices for the wires, and the pivoted loop to engage the lower end of a picket and the spring to normally raise it into engagement, substantially as described.

7. In a fence-making machine, the movable box or frame A, having the means to secure the pickets, the shoe or runner O, the pivoted loop connected to the shoe or runner, and the spring to raise the said loop to engage the lower end of the picket, substantially as described.

8. In a fence-making machine, the combination of the movable box or frame A, having the devices to secure the pickets, and the pivoted lever N, the said lever having the depending arm $n$, provided with the stirrup adapted to receive the foot of the operator, substantially as described.

In testimony that we claim the foregoing as our own we have hereto affixed our signatures in presence of two witnesses.

GRANVILLE KESLING.
LUTHER KESLING.

Witnesses:
J. M. BLISS,
SILAS KESLING.